United States Patent
Huang et al.

(10) Patent No.: US 7,406,137 B2
(45) Date of Patent: Jul. 29, 2008

(54) CARRIER RECOVERY SYSTEM AND METHOD THEREOF

(75) Inventors: Cheng-Yi Huang, I-Lan Hsien (TW); Bao-Chi Peng, Taipei (TW); Wei-Ting Wang, Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 743 days.

(21) Appl. No.: 10/710,783

(22) Filed: Aug. 2, 2004

(65) Prior Publication Data
US 2006/0023810 A1  Feb. 2, 2006

(51) Int. Cl.
*H04L 27/14* (2006.01)
*H04L 27/16* (2006.01)
*H04L 27/22* (2006.01)

(52) U.S. Cl. .............. 375/326; 375/327; 375/324; 375/325; 375/376; 348/726

(58) Field of Classification Search ......... 375/324–327, 375/340, 376; 348/726
See application file for complete search history.

(56) References Cited

U.S. PATENT DOCUMENTS

| | | | |
|---|---|---|---|
| 6,192,088 B1 | 2/2001 | Aman | |
| 6,671,342 B2 | 12/2003 | Lin | |
| 7,239,357 B2 * | 7/2007 | Jaffe | ............ 348/726 |
| 2003/0142760 A1 | 7/2003 | Kim et al. | |
| 2004/0136474 A1 * | 7/2004 | Hwang | ............ 375/326 |

OTHER PUBLICATIONS

Bretl.W. Sgrignoli.G. Snopko.P., "VSB modem subsystem design for Grand Alliance digital television receivers", Aug. 1995, p. 773-786, IEEE Transactions on Consumer Electronics.

* cited by examiner

*Primary Examiner*—Phuong Phu
(74) *Attorney, Agent, or Firm*—Winston Hsu

(57) ABSTRACT

A carrier recovery system includes an in-phase mixer for mixing an incoming signal with an in-phase reference signal to produce an in-phase baseband signal; a quadrature-phase mixer for mixing the incoming signal with a quadrature-phase reference signal to produce a quadrature-phase baseband signal; a DC detector for measuring a DC offset of the quadrature-phase baseband signal; and a frequency synthesizer for generating the in-phase reference signal and the quadrature-phase reference signal according to the DC offset measured by the DC detector. The quadrature-phase reference signal is the in-phase reference signal phase-delayed by ninety degrees. The DC offset of the quadrature-phase baseband signal is caused by a pilot tone of the VSB signal for a selected carrier in an Advanced Television Systems Committee (ATSC) digital television (DTV) receiver. By minimizing the DC offset, the carrier recover system locks the quadrature-phase reference signal and the in-phase reference signal to the selected channel.

18 Claims, 5 Drawing Sheets

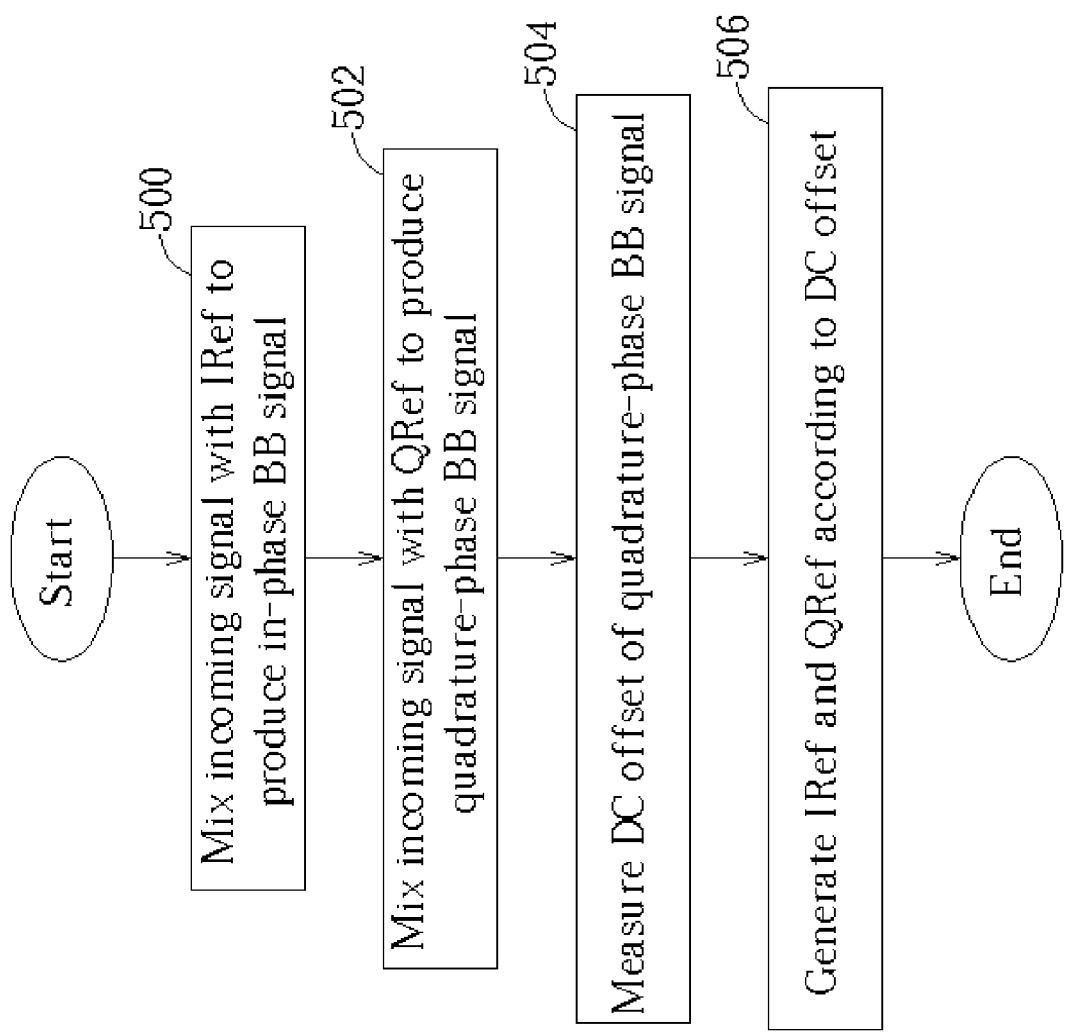

CARRIER RECOVERY SYSTEM AND METHOD THEREOF

BACKGROUND OF INVENTION

1. Field of the Invention

The invention relates to electronic communications, and more particularly, to recovering and locking a carrier of a selected channel for a vestigial sideband (VSB) Advanced Television Systems Committee (ATSC) digital television (DTV) signal.

2. Description of the Prior Art

Electronic communication and, in particular, techniques for broadcasting television video signals continue to be developed. Recently, the Advanced Television Systems Committee (ATSC) has introduced the Digital Television Standard. The resulting Digital Television (DTV) system described in the ATSC Digital Television Standard has ushered in a new era in television broadcasting. The impact of DTV is more significant than simply moving from an analog system to a digital system. Rather, DTV permits a level of flexibility wholly unattainable with analog broadcasting. An important element of this flexibility is the ability to expand system functions by building upon the technical foundations specified in ATSC standards such as the ATSC Digital Television Standard (A/53) and the Digital Audio Compression (AC-3) Standard (A/52).

Using conventional NTSC, and its PAL and SECAM counterparts, the video, audio, and some limited data information are conveyed by modulating an RF carrier in such a way that a receiver of relatively simple design can decode and reassemble the various elements of the signal to produce a program consisting of video and audio, and perhaps related data (e.g., closed captioning). As such, a complete program is transmitted by the broadcaster that is essentially in finished form. In the DTV system, however, additional levels of processing are required after the receiver demodulates the RF signal. The receiver processes the digital bit stream extracted from the received signal to yield a collection of program elements (video, audio, and/or data) that match the service(s) that the consumer selected. This selection is made using system and service information that is also transmitted. Audio and video are delivered in digitally compressed form and must be decoded for presentation.

The RF transmission subsystems used in DTV are designed specifically for terrestrial and cable applications. The structure is such that the video audio, and service multiplex/transport subsystems are useful in other applications. In RF transmission, the channel coder takes the digital bit stream and adds additional information that can be used by the receiver to reconstruct the data from the received signal which, due to transmission impairments, may not accurately represent the transmitted signal. The modulation subsystem offers two modes being based on vestigial sideband (VBS) modulation: an 8-VSB mode for terrestrial broadcast, and a 16-VSB mode for high data rates such as cable applications.

FIG. 1 shows a diagram illustrating the nominal VSB channel occupancy of an ATSC DTV signal. The 8-VSB terrestrial broadcast mode is optimized for maximum service area and provides a data payload of 19.4 Mbps in a 6 MHz channel. The 16-VSB high data rate mode, which provides twice the data rate at the cost of reduced robustness for channel degradations such a noise and multipath, provides a data payload of 38.8 Mbps in the single 6 MHz channel. Both modes provide a nominal DTV pilot tone located 310 kHz above the lower channel edge. For example, on channel 45 (656-662 MHz), the nominal pilot tone frequency is 656.310 Mhz. In a DTV transmitter, a modulation unit (or physical layer) uses digital bit stream information to modulate a carrier for the transmitted signal. The DTV receiver must recover this modulated carrier in order to lock onto the corresponding 6 MHz channel.

FIG. 2 shows a block diagram of a tuner, intermediate frequency amplifier, and FPLL in the prototype VSB receiver 200 described in the Guide to Use of the ATSC DTV Standard. The operation of the receiver 200 is described in detail on page 88 of the Guide to Use of the ATSC DTV Standard, 4 Dec. 2003, and more specifically, in U.S. Pat. No. 4,072,909, disclosed by Citta and issued on 7 Feb. 1978, which are included herein by reference. As shown in FIG. 2 and described in the above-mentioned documents, the prototype receiver 200 uses pilot carrier components in both the in-phase I and quadrature-phase Q baseband DTV signals for controlling carrier recovery.

SUMMARY OF INVENTION

One of the objectives of the claimed invention is therefore to provide a carrier recovery system using pilot carrier components in only the quadrature-phase baseband signal to recover the carrier and lock to a digital television channel.

According to an exemplary embodiment of the claimed invention, a carrier recovery system is disclosed comprising an in-phase mixer for mixing an incoming signal with an in-phase reference signal to produce an in-phase baseband signal; a quadrature-phase mixer for mixing the incoming signal with a quadrature-phase reference signal to produce a quadrature-phase baseband signal;a DC detector for measuring a DC offset of the quadrature-phase baseband signal; and a frequency synthesizer for generating the in-phase reference signal and the quadrature-phase reference signal according to the DC offset measured by the DC detector.

According to another exemplary embodiment of the claimed invention, a method of carrier recovery is disclosed comprising mixing an incoming signal with an in-phase reference signal to produce an in-phase baseband signal; mixing the incoming signal with a quadrature-phase reference signal to produce a quadrature-phase baseband signal;measuring a DC offset of the quadrature-phase baseband signal; and generating the in-phase reference signal and the quadrature-phase reference signal according to the DC offset of the quadrature-phase base-band signal.

These and other objectives of the claimed invention will no doubt become obvious to those of ordinary skill in the art after reading the following detailed description of the preferred embodiment that is illustrated in the various figures and drawings.

BRIEF DESCRIPTION OF DRAWINGS

FIG. 5 shows an operational flowchart of the carrier recovery system shown in FIG. 3.

DETAILED DESCRIPTION

Figure 1:
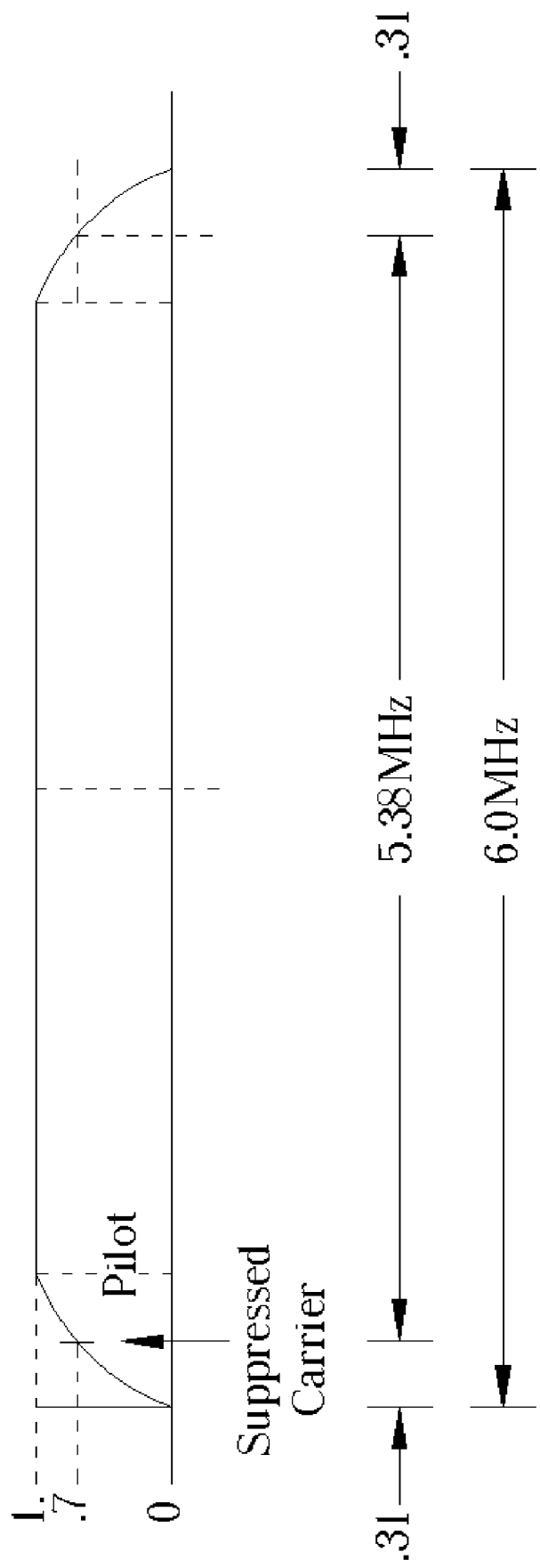
FIG. 1 is a diagram illustrating the nominal VSB channel occupancy of an ATSC DTV signal.
Figure 2:
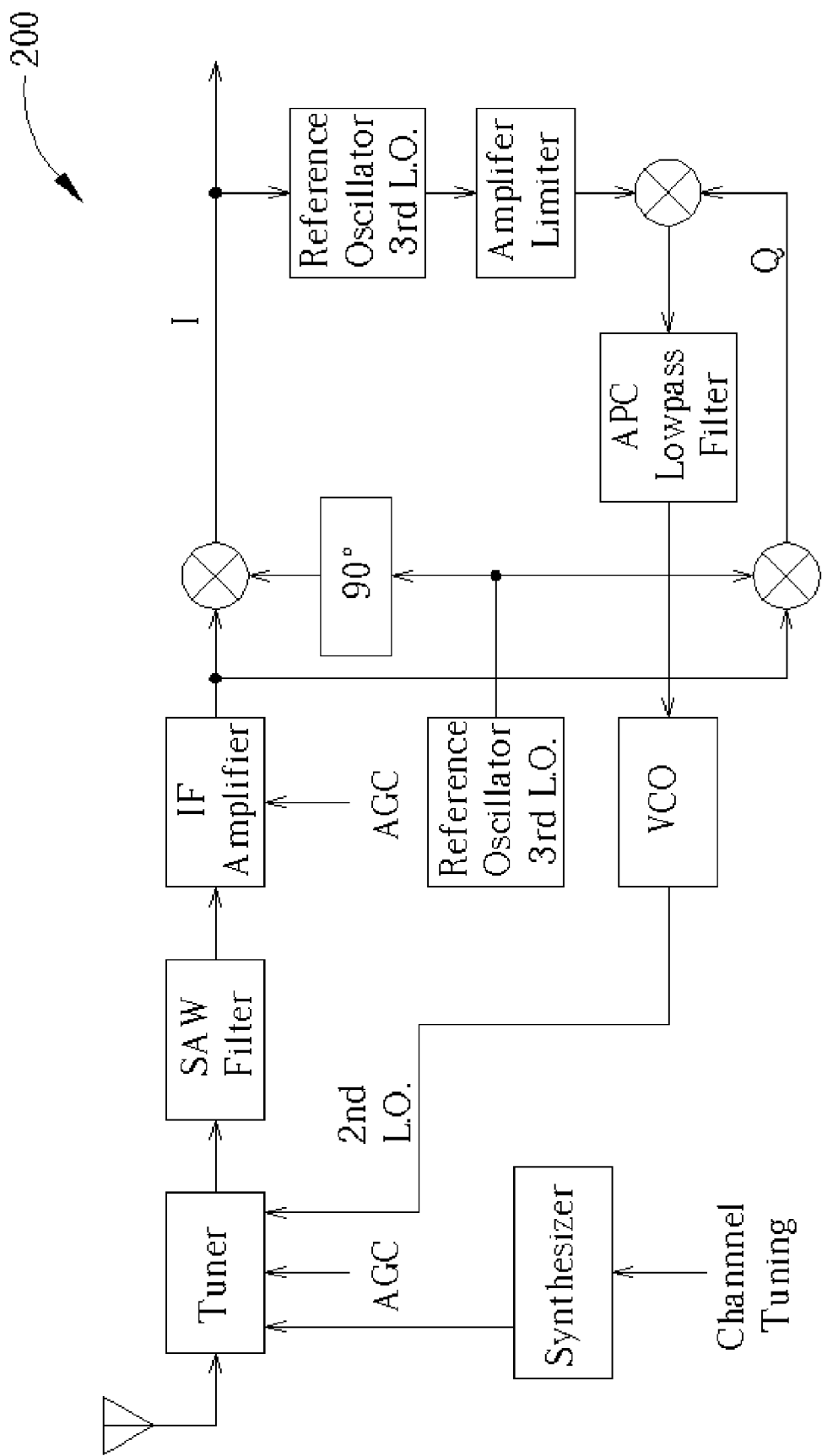
FIG. 2 is a block diagram of a tuner, intermediate frequency amplifier, and FPLL in a prototype VSB receiver according to the prior art.
Figure 3:
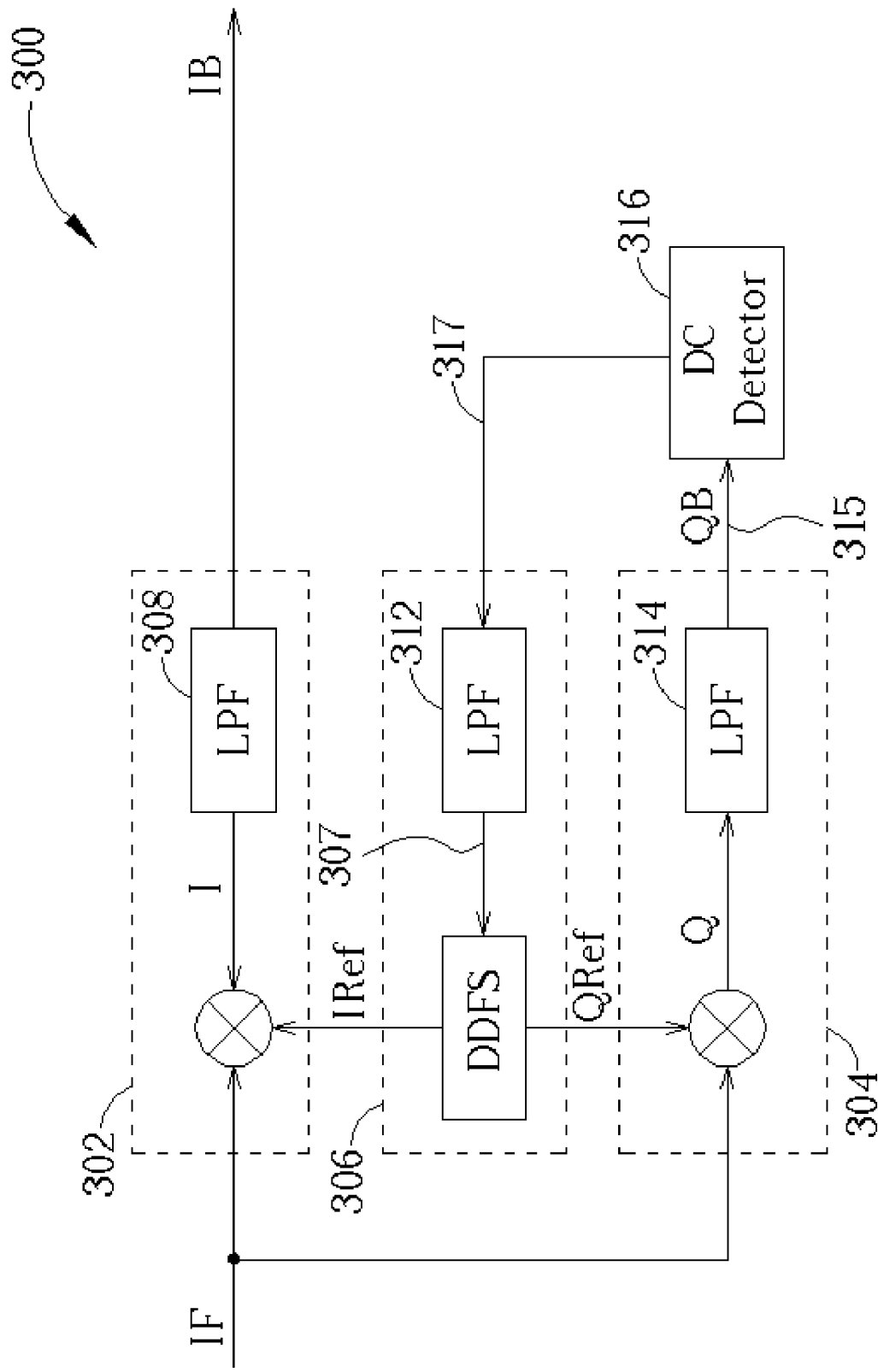
FIG. 3 is a block diagram of a carrier recovery system according to an exemplary embodiment of the present invention.

FIG. 3 shows a block diagram of a carrier recovery system 300 according to an exemplary embodiment of the present invention. In this embodiment of the present invention, the carrier recover system 300 is used in an Advanced Television Systems Committee (ATSC) digital television (DTV) receiver and locks the DTV receiver to a carrier of a selected DTV channel. The carrier recovery system 300 includes an in-phase mixer 302, a quadrature-phase mixer 304, a direct digital frequency synthesizer (DDFS) 306, and a direct current (DC) detector 316. An intermediate frequency (IF) signal is received by the carrier recovery system 300 as an incoming IF signal. This IF signal corresponds to a down-converted vestigial sideband (VSB) signal received by the DTV receiver. The IF signal has already been channel tuned for a selected DTV channel by the DTV receiver. This coarse channel tuning could be performed by the first local oscillator (1$^{st}$ L.O.) shown in FIG. 2 or another method. As the generation of the IF signal is well known to a person of ordinary skill in the art of DTV, further explanation of the origin of the IF signal is omitted.

In the carrier recover system 300 shown in FIG. 3, the DDFS 306 generates an in-phase reference signal IRef and a quadrature-phase reference signal QRef. The quadrature-phase reference signal QRef is the in-phase reference signal IRef phase-delayed by ninety degrees. The in-phase mixer 302 mixes the incoming IF signal with the in-phase reference signal IRef to generate an in-phase baseband signal IB. In this embodiment, the in-phase mixer 302 further includes an in-phase LPF 308. The in-phase base-band signal IB, which contains the data information of the selected DTV channel, is filtered by the in-phase LPF 308 to suppress a high frequency term.

In order to properly recover the data information from the selected DTV channel, the DTV receiver must be locked to the carrier of the selected DTV channel. To this end, the quadrature-phase mixer 304 mixes the incoming IF signal with the quadrature-phase reference signal QRef to generate a quadrature-phase baseband signal QB. In this embodiment, the quadrature-phase mixer 304 further includes a quadrature-phase LPF 314. The quadrature-phase baseband signal QB is filtered by the quadrature-phase LPF 314 to suppress a high frequency term. The DC detector 316 measures a DC offset of the quadrature-phase baseband signal QB. The DC offset on the quadrature-phase baseband signal QB is caused by the pilot tone added to the transmitted signal in the DTV transmitter. If the DDFS is properly locked to the carrier frequency of the DTV signal, the quadrature-phase baseband signal QB will have no DC offset. In other words, when locked, the DC offset detected by the DC detector 316 will be zero; and when the DDFS 306 is not properly locked to the carrier frequency of the DTV signal, the quadrature-phase base-band signal QB will have a DC offset. As such, the DDFS 306 generates the in-phase and quadrature-phase reference signals IRef, QRef according to the DC offset value 317 outputted by the DC detector 316. The DDFS 306 locks the frequency of the IRef and QRef signals that causes there to be no DC offset (or minimal DC offset) on the quadrature-phase baseband signal QB. In this way, carrier recover system 300 locks the DTV receiver to the carrier of the selected DTV channel and the data information located in the in-phase baseband signal IB is properly recovered. In this embodiment, the DDFS 306 further includes a LPF 312. The LPF 312 is a loop filter that outputs a control signal 307 to the DDFS 306 according to the DC offset value 317.

Figure 4:
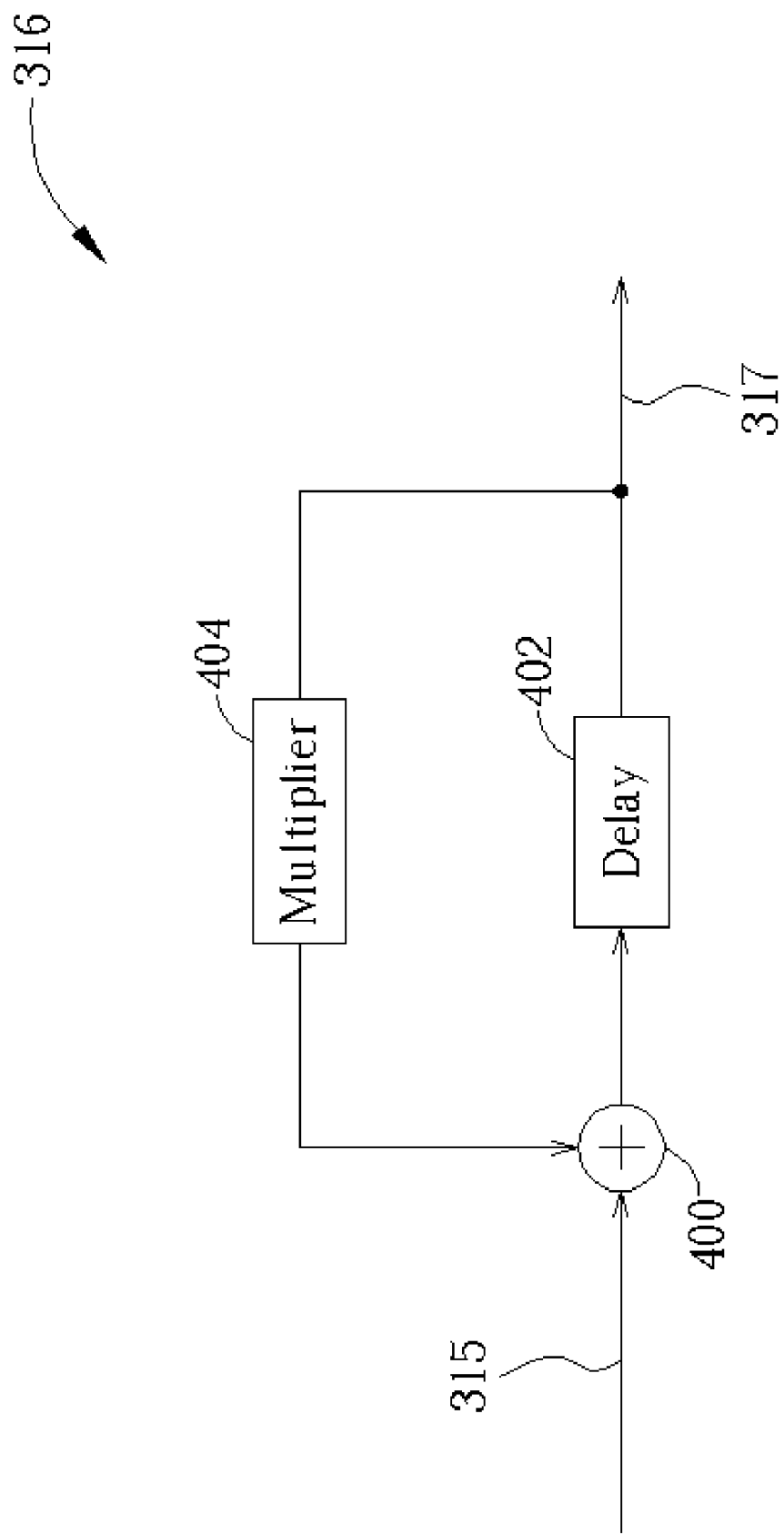
FIG. 4 shows an implementation diagram of the DC detector of FIG. 3 according to an exemplary embodiment of the present invention.

FIG. 4 shows an implementation block diagram of the DC detector 316 according to an exemplary embodiment of the present invention. The DC detector 316 includes an adder 400, a delay unit 402, and a multiplier 404. The filtered signal QB 315 is added to a feedback signal FB by the adder 400. The output of the adder 400 is delayed by a predetermined time duration by the delay unit 402. The delayed output of the delay unit 402 is the mean value 317. Additionally, the mean value 317 is multiplied by a predetermined coefficient by the multiplier 404 to produce the feedback signal FB. In this embodiment, both the predetermined time duration and the predetermined coefficient can be chosen according to design requirements. As long as the predetermined coefficient is less than one, the DC detector 316 shown in FIG. 4 operates as a moving DC detector to calculate the mean value 317. Please note, there are other methods of determining the average value of a signal well known to a person of ordinary skill in the art, and the present invention is not limited to the exemplary embodiment shown in FIG. 4.

FIG. 5 shows an operational flowchart of the carrier recovery system 300 shown in FIG. 3. The operations performed by the carrier recovery system 300 include the following steps:

Step 500: Mix an incoming IF signal with an in-phase reference signal IRef to produce an in-phase baseband signal IB.

Step 502: Mix the incoming IF signal with a quadrature-phase reference signal QRef to produce a quadrature-phase baseband signal QB.

Step 504: Measure a DC offset of the quadrature-phase baseband signal QB.

Step 506: Generate the in-phase reference signal IRef and the quadrature-phase reference signal QRef according to the DC offset of the quadrature-phase baseband signal QB. Wherein, the quadrature-phase reference signal QRef is the in-phase reference signal IRef phase-delayed by ninety degrees. When the carrier recovery system is properly locked to the carrier frequency of the incoming IF signal, the quadrature-phase baseband signal QB will have no DC offset. As such, the in-phase and quadrature-phase reference signal IRef, QRef are generated according to the DC offset value measured in Step 504. The frequency of IRef and QRef that causes there to be no DC offset (or minimal DC offset) on the quadrature-phase baseband signal QB is used to generate the in-phase reference signal IRef and the quadrature-phase reference signal QRef. In this way, the carrier recover system 300 locks the DTV receiver to the carrier of the selected DTV channel and the data information located in the in-phase baseband signal IB is properly recovered.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A carrier recovery system comprising:
   an in-phase mixer for mixing an incoming signal with an in-phase reference signal to produce an in-phase baseband signal;
   a quadrature-phase mixer for mixing the incoming signal with a quadrature-phase reference signal to produce a quadrature-phase baseband signal;
   a DC detector for measuring a DC offset of the quadrature-phase baseband signal; and
   a frequency synthesizer for generating the in-phase reference signal and the quadrature-phase reference signal according to the DC offset measured by the DC detector;
   wherein the DC detector comprises:

an adder for adding the quadrature-phase baseband signal to a feedback signal for producing an added value;

delay unit coupled to the adder for generating an output being the added value delayed by a predetermined time; and multiplier coupled to the delay unit is used for multiplying the output of the delay unit by a predetermined coefficient to produce the feedback signal.

2. The carrier recovery system of claim 1, wherein the carrier recover system locks the quadrature-phase reference signal and the in-phase reference signal to a selected channel in an Advanced Television Systems Committee (ATSC) digital television (DTV) receiver.

3. The carrier recovery system of claim 1, wherein the incoming signal corresponds to a received vestigial sideband (VSB) signal.

4. The carrier recovery system of claim 1, wherein the frequency synthesizer generates the in-phase reference signal and the quadrature-phase reference signal to minimize the DC offset of the quadrature-phase baseband signal.

5. The carrier recovery system of claim 1, wherein the quadrature-phase mixer comprises a first low-pass filter receiving the quadrature-phase baseband signal for filtering out the high frequency term of the quadrature-phase baseband signal.

6. The carrier recovery system of claim 1, wherein the frequency synthesizer comprises a second low-pass filter coupled to the DC detector and the frequency synthesizer.

7. The carrier recovery system of claim 6, wherein the second low-pass filter is a loop filter.

8. The carrier recovery system of claim 1, wherein the predetermined coefficient is a value less than one.

9. The carrier recovery system of claim 1, wherein the in-phase mixer comprises a third low-pass filter receiving the in-phase baseband signal for filtering out a high frequency term of the in-phase baseband signal.

10. A method of carrier recovery comprising:

mixing an incoming signal with an in-phase reference signal to produce an in-phase baseband signal;

mixing the incoming signal with a quadrature-phase reference signal to produce a quadrature-phase baseband signal;

measuring a DC offset of the quadrature-phase baseband signal; and generating the in-phase reference signal and the quadrature-phase reference signal according to the DC offset of the quadrature-phase baseband signal;

wherein measuring the DC offset of the quadrature-phase baseband signal comprises:

adding the quadrature-phase baseband signal and a feedback signal to produce an added value;

delaying the added value by a predetermined time; and multiplying the delayed added value by a predetermined coefficient to produce the feedback signal.

11. The method of claim 10, further comprising locking the quadrature-phase reference signal and the in-phase reference signal to a selected channel in an Advanced Television Systems Committee (ATSC) digital television (DTV) receiver.

12. The method of claim 10, wherein the quadrature-phase reference signal is the in-phase reference signal phase-delayed by ninety degrees.

13. The method of claim 10, wherein the incoming signal corresponds to a received vestigial sideband (VSB) signal.

14. The method of claim 13, wherein the DC offset of the quadrature-phase baseband signal is caused by to a pilot tone of the VSB signal for a selected carrier.

15. The method of claim 10, further comprising generating the in-phase reference signal and the quadrature-phase reference signal to minimize the DC offset of the quadrature-phase baseband signal.

16. The method of claim 10, further comprising filtering out a high frequency term of the quadrature-phase baseband signal.

17. The method of claim 10, further comprising filtering out a high frequency term of the in-phase baseband signal.

18. The method of claim 10, wherein the predetermined coefficient is a value less than one.

* * * * *